Patented May 13, 1952

2,596,198

UNITED STATES PATENT OFFICE 2,596,198

MOTOR FUELS

Alcippe Bègue, La Plaine des Palmistes, Ile de la Reunion

No Drawing. Application July 20, 1949, Serial No. 105,909. In France July 8, 1949

6 Claims. (Cl. 44—56)

The object of my invention is a method for improving motor-fuels and more particularly for motor-fuels containing alcohol. Another object of my invention is a new motor-fuel.

Attempts have already been made over a considerable period of time, to use motor-fuels in internal combustion engines containing gasoline, admixed with alcohol, the heating power of which, although less than that of the gasoline, is sufficiently high to yield similar operative power. The results, however, have been disappointing.

In examining a down-draught carburettor when idling which has been fed with an industrial motor-fuel consisting of about 80 to 90% alcohol at 92–95° and 10 to 20% gasoline, with the air-filter removed, it will be observed that at the inlet of the engine, the motor-fuel is in the form of batches of heavy drops, and, that the atomizing is not uniform. The mixture of industrial alcohol, gasoline and air is, therefore, very imperfect.

If the compensating jet is disassembled from such a carburetor, fed with the previous motor-fuel, there will always be noticed an "eyepiece" or veil inside this jet. This veil is caused by the presence of water.

It should be carefully observed in this case that the industrial alcohol and gasoline mixtures are more or less homogeneous depending on the temperature. Thus the 50% mixture is homogeneous above about 45° C. On the other hand the mixture with 80% industrial alcohol is homogeneous from about 15° C., and decants at a lower temperature; the same thing occurring with mixtures of lower gasoline content. The atomization and vaporization, the forced passage in the jets, (which has a particularly strong effect with a fuel of high capillarity) and the depression due to the intake suction of the cylinders, results in a temperature decline and in a separation of the homogeneous industrial alcohol gasoline mixtures into two layers. The lower layer, which contains water, is in contact with the jets, thereby resulting in imperfect feeding of the engine. The engine runs well or badly according to the layer that is used for vaporization. The upper layer, of low capillary attraction, vaporizes properly. The lower layer, with strong capillary attraction, makes a very poor passage. On the other hand, due to the differences in the richness of the vaporized mixture, the engine works at a very uneven rate.

With regard to the industrial alcohol alone, the imperfect feeding may be ascribed to the fall in temperature caused by the depression of the vaporization, and above all to the much greater capillary attraction of this liquid, the result of which is a very poor passing through the jets and the formation of an imperfect mixture with the air.

The process according to my invention provides a solution for such difficulties through the addition to the motor-fuel of small amounts of at least one element of the group comprising the taurocholic and glycocholic acids and their salts (more particularly their alkaline salts). These compounds which are present in the gall (bile) of living animal bodies, lower to a great extent the surface tension of certain fluids. Their action is particularly noticeable, especially in water, in proportion as small as 1 for 10,000 units of gall. It may be noted that the acids mentioned above and their alkaline salts are soluble in alcohol.

My invention provides for the addition of these compounds in the shape of animal gall as well as in the shape of the compounds themselves (for instance in the crystalline state). When use is made of gall, it will prove beneficial to dissolve it beforehand in a small amount of neutral alcohol, to thoroughly mix and let it decant to a clear solution. The product prepared in this way is very well preserved, preferably by keeping it in a green or black glass container.

These compounds may be added to methyl alcohol, to ethyl alcohol, to the gasoline or to any other mixture, in any proportions. These products may be added to similar motor-fuels. Their action has the tendency of increasing the fineness of the atomization, thereby yielding a more even combustion, with increased speeds of explosive waves. On the other hand, it is advisable to eliminate any fatty substance of animal or vegetable origin such as, castor-oil from motor fuels containing these addition compounds due to the possible reactivity therebetween in the form of emulsification. Accordingly, another object of my invention is to rid the motor-fuels of such substances before adding the aforesaid gall elements. Similarly, benzene appears to cancel the action of these compounds and must likewise be eliminated. It is probable, but in the present stage of investigations, it may not be stated positively, that any element of the aromatic series is detrimental.

The effective proportion of these compounds, according to the invention, is very small. There is a perceptible action with a gravimetric proportion of 1 for 10,000 in weight of gall, or, about 0.1 cc. of gall per liter of motor-fuel. The presence in the motor-fuel of fluids having a comparatively strong surface tension increases the proportion of these compounds required to obtain a fixed result. It is a matter of difficulty to settle this proportion which depends on the character and proportions of the fuel-oil components (such as gasoline, alcohol, etc.) and is thus subject to changes ad infinitum. Nevertheless, an excessive proportion does no harm. In practice, the effective proportion does not exceed a few cubic centimetres per liter of motor-fuel (calculated as gall).

More particularly, taking into consideration the ease with which the product obtained may be tested, it is advantageous to add to a motor-fuel containing alcohol at least the amount required to meet the surface tension thereof or the characteristics of pulverisation which are available with the gasoline, thereby avoiding any change of equipment (more particularly of the jet of an internal combustion engine) and perfecting a motor-fuel which is capable of replacing the gasoline without any adjustment of the injection parts (except the float or other parts liable to be affected by the density of the motor-fuel).

For example, in the case of a fuel-oil containing about 80% industrial ethyl alcohol, at 90–95°, and gasolone spirit, a proportion of 0.5 cc. of gall per liter of alcohol has proven satisfactory.

It is probable, that taurocholic and glycocholic acids and their salts act as sensitizers for the chain reactions that take place upon explosion of the vaporized mixture. Consequently, the presence of anti-knock compounds which delay the appearance of these reactions renders it advantageous to increase the proportion of these compounds slightly. A further object of my invention is the obtention of a new motor-fuel consisting of any motor-fuel as already known which contains at least one of the elements of the taurocholic acid series, glycocholic acid, and their salts, in any proportion, even if it is only a trace.

More particularly my invention relates to motor-fuels of a gasoline and alcohol base, containing at least one of the compounds to which reference is made in my present application, and more especially to motor-fuels of this type in which the proportions of alcohol and gasoline are regulated in order to yield a fixed rate of compression, which is obtainable by virtue of the higher self-ignition point of the alcohol thereby effecting higher compressions. For example, in order to obtain a fixed rate of compression between that of the ordinary gasoline (about 6) and of alcohol (about 13 or 14), a fuel-oil may be compounded, taking into consideration its self-ignition point, by selecting the corresponding proportion of gasoline and alcohol.

A further object of my invention relates to a new compound for the improvement of motor-fuels of any composition. This compound may be selected from the group consisting of taurocholic acid, glycocholic acid, and any of the salts of said acids. This compound or any admixture thereof may be added to any motor-fuel in order to improve it, and more particularly, may be added to motor-fuels containing alcohol in order to use such a fuel as pure gasoline without the disadvantage of adjusting the injection parts of the motor.

As an example of results obtained, with a Renault car, Prima 4, 14 H. P., 4 cylinders, by using 2 liters of a motor-fuel containing a mixture of 80% alcohol at 93° and 20% and heavy gasoline of 0.726 density, to which has been added 0.5 cc. of gall per liter, a distance of 14,200 km. was covered, whereas 2 liters of the same motor-fuel, without any addition, used under the same conditions permitted only a distance of 10,700 km. to be covered. It will readily be understood that, with the high compression rates obtainable, such an alcoholic motor-fuel is superior to gasoline, especially for reaction engines.

What I claim is:

1. A motor fuel comprising gasoline, an alcohol selected from the group consisting of ethyl and methyl alcohol, and .1–.5 cc. of a substance selected from the group consisting of glycocholic acid, taurocholic acid and the soluble alkaline salts of said acids per liter of motor-fuel.

2. A motor-fuel comprising gasoline, an alcohol and .1–.5 cc. of a substance selected from the group consisting of glycocholic acid, taurocholic acid and the soluble alkaline salts of said acids per liter of motor fuel.

3. A motor fuel comprising gasoline, an alcohol and .1–.5 cc. of animal gall per liter of motor-fuel.

4. A motor-fuel free of vegetable and animal fatty substances comprising gasoline, an alcohol and .1–.5 cc. of animal gall per liter of motor-fuel.

5. A motor-fuel comprising gasoline, an alcohol and a minor proportion of a substance selected from the group consisting of glycocholic acid, taurocholic acid and the soluble alkaline salts thereof effective to lower the surface tension of said motor-fuel.

6. A motor-fuel comprising gasoline, an alcohol and a minor proportion of animal gall effective to lower the surface tension of said motor-fuel.

ALCIPPE BÈGUE.

REFERENCES CITED

The following references are of record in the file of this patent:

Lange's Handbook of Chemistry, 6th ed., 1946, pp. 510, 511, 626 and 627.